United States Patent
Lee et al.

(10) Patent No.: US 12,515,536 B2
(45) Date of Patent: Jan. 6, 2026

(54) METHOD OF PROVIDING GUIDANCE FOR USE OF ELECTRIC POWER OF ELECTRIC VEHICLE

(71) Applicants: HYUNDAI MOTOR COMPANY, Seoul (KR); KIA CORPORATION, Seoul (KR)

(72) Inventors: Hee Yun Lee, Seoul (KR); Ho Won Seo, Gwacheon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 761 days.

(21) Appl. No.: 17/868,565

(22) Filed: Jul. 19, 2022

(65) Prior Publication Data

US 2023/0066396 A1 Mar. 2, 2023

(30) Foreign Application Priority Data

Aug. 30, 2021 (KR) .................. 10-2021-0114357

(51) Int. Cl.
*B60L 15/20* (2006.01)
*B60L 1/00* (2006.01)
(Continued)

(52) U.S. Cl.
CPC ........... *B60L 15/2045* (2013.01); *B60L 1/003* (2013.01); *B60L 58/12* (2019.02); *G01C 21/3476* (2013.01); *G07C 5/0816* (2013.01)

(58) Field of Classification Search
CPC ...... B60L 15/2045; B60L 1/003; B60L 57/12; B60L 1/00; B60L 2250/14;
(Continued)

(56) References Cited

U.S. PATENT DOCUMENTS

2016/0152154 A1 6/2016 Mizuno et al.
2019/0176640 A1 6/2019 Lee et al.
(Continued)

FOREIGN PATENT DOCUMENTS

JP 2015012697 A 1/2015
KR 10-2013-0047902 A 5/2013
(Continued)

*Primary Examiner* — Thomas Ingram
(74) *Attorney, Agent, or Firm* — Morgan Lewis & Bockius LLP

(57) ABSTRACT

The present disclosure provides a method of providing guidance for use of electric power of an electric vehicle capable of limiting use of electric power in a vehicle-to-load (V2L) mode or providing various pieces of information on use of the electric power. The method includes receiving information on a set travel route to an electric vehicle charging station in the V2L mode, calculating battery energy requirements necessary for the vehicle to move from the current location to a charging station along the travel route, calculating available amount of energy in the V2L mode based on the battery energy requirements and the current amount of energy of a battery, calculating an available usage time of an electronic product based on electric power consumption per unit time of the electronic product and the available amount of energy, and displaying the available usage time of the electronic product through an information-providing device.

20 Claims, 3 Drawing Sheets

(51) Int. Cl.
  *B60L 58/12*   (2019.01)
  *G01C 21/34*   (2006.01)
  *G07C 5/08*    (2006.01)

(58) Field of Classification Search
  CPC .... B60L 2250/16; B60L 2260/54; B60L 8/03; B60L 2240/622; B60L 1/006; B60L 1/02; G01C 21/3476; G01C 21/3469; G07C 5/0816; Y02T 10/70; Y02T 90/16
  See application file for complete search history.

(56) References Cited

U.S. PATENT DOCUMENTS

| | | | | |
|---|---|---|---|---|
| 2020/0047622 | A1* | 2/2020 | Asr | H02J 7/007188 |
| 2022/0294244 | A1* | 9/2022 | Helm | B60L 58/13 |
| 2023/0104157 | A1* | 4/2023 | Salter | B60L 58/12 |
| | | | | 307/10.1 |
| 2023/0406131 | A1* | 12/2023 | Quint | B60L 53/62 |
| 2024/0149719 | A1* | 5/2024 | Ropel | B60L 53/66 |

FOREIGN PATENT DOCUMENTS

| | | |
|---|---|---|
| KR | 10-2018-0071150 A | 6/2018 |
| KR | 10-2019-0069996 A | 6/2019 |
| KR | 10-2019-0126627 A | 11/2019 |
| KR | 10-2021-0006768 A | 1/2021 |
| KR | 10-2021-0023072 A | 3/2021 |

* cited by examiner

METHOD OF PROVIDING GUIDANCE FOR USE OF ELECTRIC POWER OF ELECTRIC VEHICLE

CROSS-REFERENCE TO RELATED APPLICATION

This application claims under 35 U.S.C. § 119(a) the benefit of priority from Korean Patent Application No. 10-2021-0114357 filed on Aug. 30, 2021, the entire contents of which are incorporated herein by reference.

TECHNICAL FIELD

The present disclosure relates to a method of providing guidance for use of electric power of an electric vehicle, and more particularly to a method of providing guidance for use of electric power of an electric vehicle to provide guidance for use of electric power in a vehicle-to-load (V2L) mode of the electric vehicle.

BACKGROUND

Recently, with increasing concern about energy efficiency, environmental pollution, and depletion of fossil fuels, environment-friendly vehicles have been actively developed with the goal of substantial replacement of vehicles having internal combustion engines.

Environment-friendly vehicles may be classified into a battery electric vehicle (BEV), which uses a battery as a power source (an electric power source), a fuel-cell electric vehicle (FCEV), which uses a fuel cell as a main power source, and a hybrid electric vehicle (HEV), which uses an engine and a motor as power sources for driving a vehicle.

All of these environment-friendly vehicles (xEVs) are driven by activating a motor using electric power charged in a battery, and thus are, in a broad sense, electric vehicles. A high-voltage battery pack for supplying electric power to a motor is mounted in an electric vehicle. The high-voltage battery pack repeats charging and discharging while a vehicle travels in order to supply electric power to power electronic parts of a vehicle, such as a motor.

With development of a vehicle-to-load (V2L) function in recently developed electric vehicles, the electric power of the vehicles can be used in various situations, such as when camping. A V2L function is technology enabling the supply of electric power of a battery mounted in an electric vehicle to external equipment. General household electronic products, such as a laptop computer, an electric heater, an electric rice cooker, a hair dryer, sound equipment, or a speaker, can be connected to a vehicle and used by receiving voltage (e.g. 220V) and required power (kW), which are similar to those set in a general household.

The V2L function of a vehicle enables the supply of electric power to external equipment without additional equipment using a high-voltage battery, an auxiliary battery, a power conversion device realizing bidirectional conversion of electric power, an integrated charging system such as an on-board charger (OBC), and a vehicle charging management system managing the transfer of electric power between the battery and the integrated charging system.

Since a vehicle can be used as one electric power supply source due to the V2L function, electronic products for everyday use are capable of being used in the vehicle, and as a result, utilization of the vehicle may be greatly improved.

However, because the V2L function consumes the electric power of the battery in the vehicle, the same may have an influence on the state of charge of the battery before the vehicle is driven. Therefore, the amount of electric power consumed in the V2L mode may affect the travelable distance of the electric vehicle.

In an electric vehicle, even if the travelable distance, which is determined based on the amount of electric power consumed in the V2L mode, is displayed on a cluster of the vehicle, it is not easy for a user to consume electric power as planned in consideration of the distance to a charging station and the amount of electric power consumed when using electric power in the V2L mode. Therefore, uncertainty associated with arrival at a charging station is increased due to reduction of the travelable distance of the vehicle attributable to use of electric power in the V2L mode.

The conventional electric vehicle employs technology for recommending a charging station located at an appropriate place, technology for recommending an optimal charging station based on a charge waiting time, or technology for searching for and recommending a charging station using traffic volume information. However, technology for limiting use of electric power in the V2L mode or providing information on use of the electric power has not been developed.

The above information disclosed in this Background section is only for enhancement of understanding of the background of the disclosure and therefore it may contain information that does not form the related art that is already known in this country to a person of ordinary skill in the art.

SUMMARY OF THE DISCLOSURE

The present disclosure has been made in an effort to solve the above-described problems associated with the related art, and it is an object of the present disclosure to provide a method of providing guidance for use of electric power of an electric vehicle that is capable of limiting use of electric power in a V2L mode of an electric vehicle or providing information on use of the electric power.

However, the objects to be accomplished by the disclosure are not limited to the above-mentioned object. The objects of the disclosure will be more apparent from the following description, and will be realized by means of the elements and combinations thereof pointed out in the appended claims.

In one aspect, the present disclosure provides a method of providing guidance for use of electric power of an electric vehicle, the method including receiving, by a controller of the vehicle, information on a set travel route to an electric vehicle charging station near the current location of the vehicle from a navigation device in a vehicle-to-load (V2L) mode, calculating, by the controller, battery energy requirements necessary for the vehicle to move from the current location to a charging station along the set travel route using a motor based on predicted driving information collected by the vehicle, calculating, by the controller, available amount of energy in the V2L mode based on the calculated battery energy requirements and the current amount of energy of a battery, calculating, by the controller, an available time of an electronic product based on electric power consumption per unit time of the electronic product and the calculated available amount of energy, and displaying, by the controller, the calculated available time of the electronic product through an information-providing device.

Other aspects and preferred embodiments of the disclosure are discussed infra.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
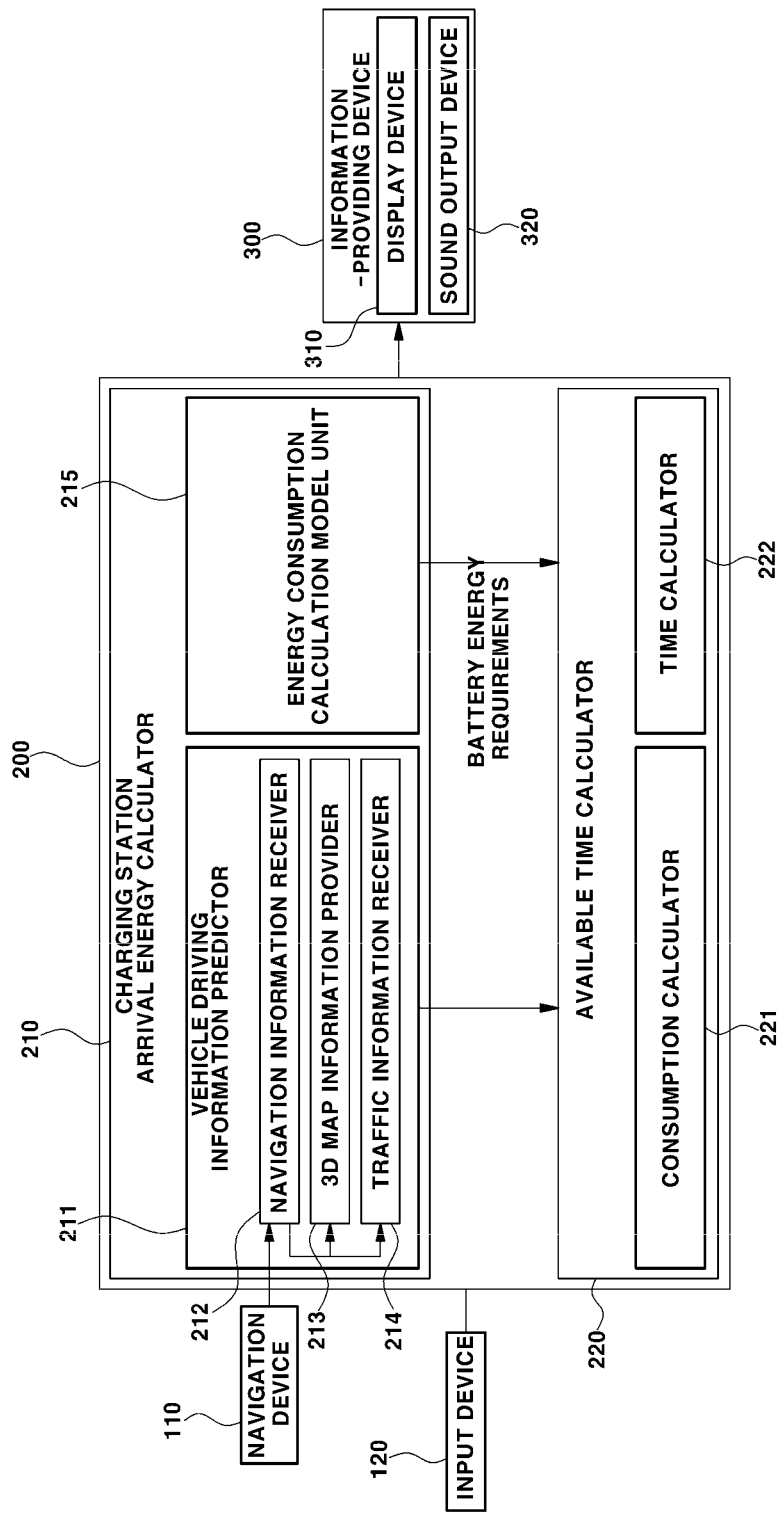
FIG. 1 is a block diagram showing the configuration of an apparatus for providing guidance for use of electric power according to an embodiment of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Various exemplary embodiments will now be described more fully with reference to the accompanying drawings, in which only some exemplary embodiments are shown. Specific structural and functional details disclosed herein are merely representative for the purpose of describing exemplary embodiments. The present disclosure, however, may be embodied in many alternate forms, and should not be construed as being limited only to the exemplary embodiments set forth herein. Accordingly, while exemplary embodiments of the disclosure are capable of being variously modified and taking alternative forms, embodiments thereof are shown by way of example in the drawings and will herein be described in detail. It should be understood, however, that there is no intent to limit the present disclosure to the particular exemplary embodiments disclosed. On the contrary, exemplary embodiments are to cover all modifications, equivalents, and alternatives falling within the scope of the disclosure.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the exemplary embodiments of the present disclosure.

It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present. Other words used to describe the relationship between elements should be interpreted in a like fashion (e.g. "between" versus "directly between", "adjacent" versus "directly adjacent", etc.).

Wherever possible, the same reference numbers will be used throughout the drawings to refer to the same or like parts. The terminology used herein is for the purpose of describing particular embodiments only and is not intended to be limiting of exemplary embodiments of the disclosure. As used herein, the singular forms "a", "an", and "the" are intended to include the plural forms as well, unless the context clearly indicates otherwise. It will be further understood that the terms "comprises", "comprising", "includes", and/or "including", when used herein, specify the presence of stated components, steps, operations and/or elements, but do not preclude the presence or addition of one or more other components, steps, operations and/or elements.

Hereinafter, embodiments of the present disclosure will be described in detail with reference to the accompanying drawings.

The present disclosure provides a method of providing guidance for use of electric power of an electric vehicle that is capable of limiting use of electric power in a V2L mode of an electric vehicle or providing various pieces of information on use of the electric power.

In particular, the present disclosure provides a method of estimating the amount of driving energy to be consumed to reach a charging station near a vehicle found by a navigation device or an arbitrary charging station selected by a user based on a route to the charging station when the user uses a V2L function, calculating battery energy requirements for reaching the charging station based on the result of estimation, and providing information on the amount of electric energy that can be used or the available time of electric energy or providing guidance with regard to limiting usage of the V2L mode based on the result of calculation.

The term "electric vehicle" is used herein in a broad sense, and includes a motorized vehicle that is equipped with a high-voltage battery and drives using a motor, that is, a battery electric vehicle (BEV), which is a pure electric vehicle, a hybrid electric vehicle (HEV), and a fuel-cell electric vehicle (FCEV).

FIG. 1 is a block diagram showing the configuration of an apparatus for providing guidance for use of electric power according to an embodiment of the present disclosure. As illustrated, an apparatus for providing guidance for use of electric power of an electric vehicle according to an embodiment of the present disclosure may be incorporated in a controller 200, which will be described later. The apparatus for providing guidance for use of electric power of an electric vehicle includes a charging station arrival energy calculator 210 and an available time calculator 220.

In FIG. 1, reference numeral "211" denotes a vehicle driving information predictor, and reference numeral "215" denotes an energy consumption calculation model unit (or an energy consumption calculator). As illustrated, the charging station arrival energy calculator 210 includes the vehicle driving information predictor 211 and the energy consumption calculation model unit 215.

Assuming that the vehicle travels the route to the charging station, the vehicle driving information predictor 211 receives and provides driving information on the vehicle traveling along the route to the charging station. The vehicle driving information predictor 211 may include a navigation information receiver 212, a 3D map information provider 213, and a traffic information receiver 214.

The navigation information receiver 212 receives information on charging stations located near the vehicle based on the current location of the vehicle from a navigation device 110 of the vehicle. Here, the navigation device 110 searches for charging stations for electric vehicles located near the vehicle based on the current location of the vehicle, displays the found charging stations through a display device (a navigation display), and sets the travel route to each charging station. The travel route to each charging station set by the navigation device 110 is also transmitted to the navigation information receiver 212.

In addition, a user (a driver, etc.) may select and input a desired charging station from among the charging stations near the vehicle displayed by the navigation device 110. At this time, information on the charging station selected and input by the user and the travel route may be transmitted from the navigation device 110 to the navigation information receiver 212.

In addition, the navigation information receiver 212 provides the received information on the travel route to each charging station to the 3D map information provider 213, the traffic information receiver 214, and the energy consumption calculation model unit 215.

The 3D map information provider 213 searches for, based on the distance, information on a road slope present along the travel route to each charging station transmitted from the navigation information receiver 212, and provides the found road slope information to the energy consumption calculation model unit 215.

The traffic information receiver 214 may be an intelligent transport system (ITS) information receiver, which receives real-time traffic information from an ITS present outside the vehicle and provides the real-time traffic information. The ITS information receiver receives information on the travel route to each charging station from the navigation information receiver 212 and receives real-time traffic information on the road in the travel route to each charging station from the ITS present outside the vehicle to provide the same to the energy consumption calculation model unit 215.

For example, the ITS information receiver may search for information on traffic signals present along the travel route to each charging station, information on traffic congestion in each section (information on the average speed of vehicles), minimum speed information, and speed limit information, and may provide the found information to the energy consumption calculation model unit 215.

The energy consumption calculation model unit 215 predicts the amount of electric energy required for the vehicle to travel the set travel route using a vehicle energy consumption model based on various pieces of information provided from the vehicle driving information predictor 211.

That is, the energy consumption calculation model unit 215 calculates and predicts battery energy requirements (remaining state of charge (SOC) requirements) necessary to reach each charging station or the charging station selected by the user based on the information provided from the vehicle driving information predictor 211.

In addition, the energy consumption calculation model unit 215 transmits the calculated battery energy requirements to the available time calculator 220. A detailed description of the process of calculating the battery energy requirements will be made later.

The available time calculator 220 measures and calculates the current V2L electric power consumption average (e.g. the power consumption average for 5 minutes), and calculates the available V2L electric power time based on the current amount of energy of the battery (the current SOC of the battery) and the current V2L electric power consumption average.

The available time calculator 220 includes a consumption calculator 221 configured to calculate the V2L electric power consumption average and a time calculator 222 configured to calculate the available V2L electric power time based on information on the current amount of energy of the battery, information on the calculated V2L electric power consumption average, and information on the battery energy requirements received by the energy consumption calculation model unit 215 of the charging station arrival energy calculator 210.

In addition, the apparatus for providing guidance for use of electric power according to the embodiment of the present disclosure further includes an input device 120 configured to allow the user (the driver, etc.) to input necessary information therethrough, and an information-providing device 300 configured to display and provide information. The input device 120 and the information-providing device 300 are connected to the controller 200 for input and output of signals therebetween.

Hereinafter, the roles and operation of the components of the apparatus for providing guidance for use of electric power will be described in more detail in connection with the process of providing guidance for use of electric power according to the embodiment of the present disclosure.

Figure 2:
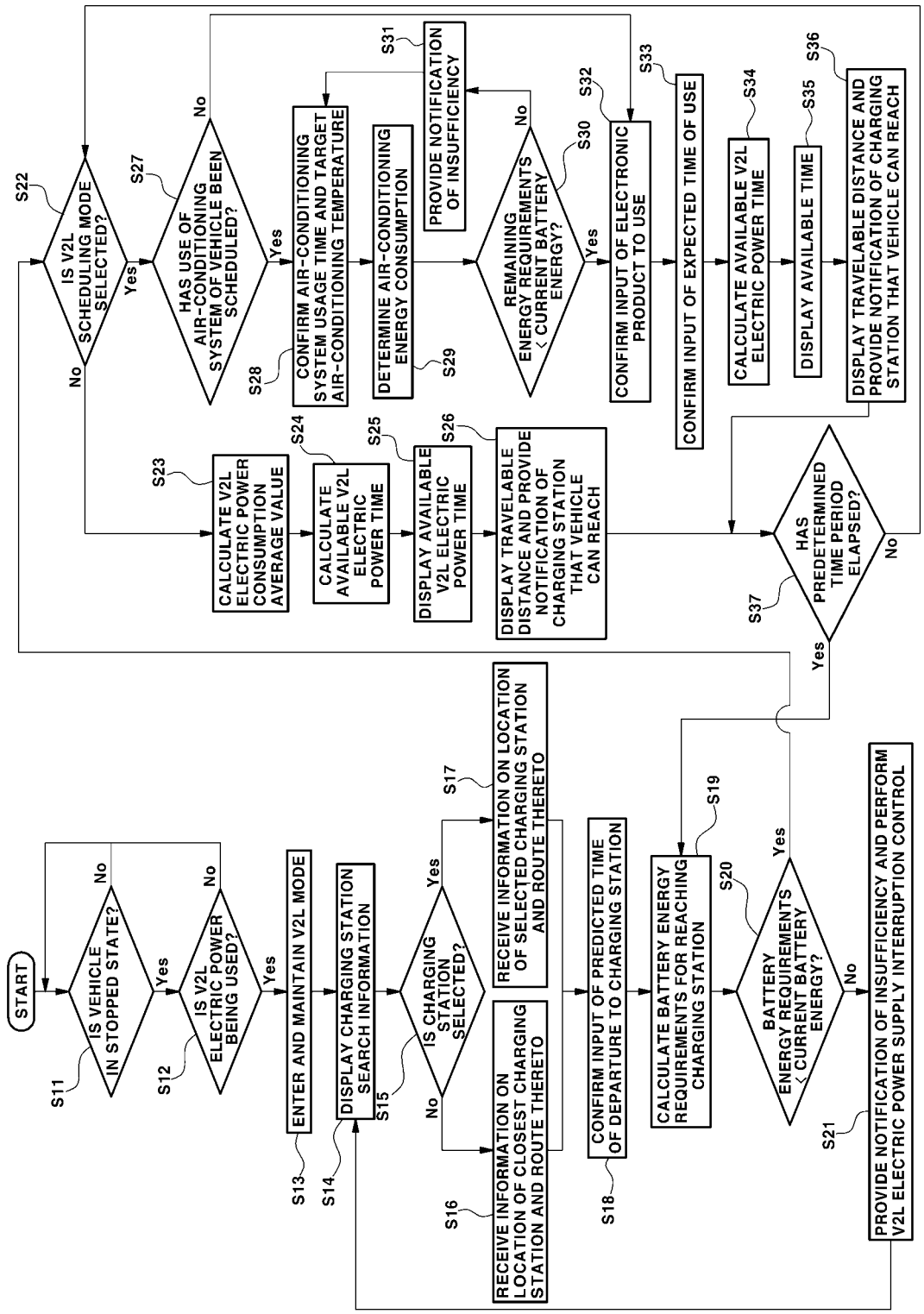
FIG. 2 is a flowchart showing the process of providing guidance for use of electric power according to an embodiment of the present disclosure.

FIG. 2 is a flowchart showing the process of providing guidance for use of electric power according to the embodiment of the present disclosure. The process of providing guidance for use of electric power shown in FIG. 2 may be performed by the charging station arrival energy calculator 210 and the available time calculator 220 of the controller 200 of the vehicle (or may be performed by the controller 200 of the vehicle), and may be performed in the V2L mode while the vehicle is stopped based on the information collected by the vehicle.

First, the controller 200 checks whether the vehicle is in a stopped state (S11), and checks whether a predetermined magnitude or more of V2L electric power is being used in the vehicle (S12). When V2L electric power is used, the controller 200 enters and maintains a V2L mode (S13).

Specifically, upon determining that a predetermined magnitude or more of V2L electric power is being consumed in the vehicle in a stopped state, the controller 200 enters the V2L mode, notifies the user (the driver, etc.) of entry to the V2L mode through the information-providing device 300, and maintains the V2L mode while V2L electric power is being consumed.

Here, consumption of V2L electric power means connecting an electronic product (or a load), such as a laptop computer, an electric heater, an electric rice cooker, a hair dryer, sound equipment, or a speaker, to the vehicle and consuming electric power necessary for operation of the electronic product from the battery of the vehicle.

In addition, when entering the V2L mode, the navigation device 110 searches for electric vehicle charging stations located within a predetermined distance (e.g. 10 km) from the current location of the vehicle (S14), and displays the found charging stations on the display device (the navigation display). In addition, a travel route from the current location of the vehicle to each charging station is set.

At this time, the user may select a desired charging station from among the charging stations found by the navigation device 110, and information about the charging station selected by the user and the travel route thereto is transmitted to the navigation information receiver 212 of the controller 200 (S15 and S17).

When the user does not select a charging station through the navigation device 110, information about all of the electric vehicle charging stations located within a predetermined distance and the travel route thereto may be transmitted to the navigation information receiver 212 of the controller 200.

Alternatively, when the user does not select a charging station, the charging station that most meets the default requirements set by the navigation device 110, for example, the charging station that is the closest to the current location of the vehicle, may be selected, and information about the corresponding charging station and the travel route thereto may be transmitted to the navigation information receiver 212 of the controller 200 (S15 and S16).

Subsequently, the controller 200 may guide the user to input a predicted departure time at which to start to move to the electric vehicle charging station through the display device 310 of the information-providing device 300 of the vehicle. Accordingly, the user inputs the predicted departure time through the input device 120, and the controller 200 receives the predicted departure time set and input by the user through the input device 120 (S18). For example, the user may input 10 a.m. the next day as the predicted departure time.

The predicted departure time information input by the user may be used to calculate a usage time from the current time to the predicted departure time and to calculate the amount of V2L electric power that is expected to be used. For example, when the predicted departure time input by the user is 10 a.m. the next day, the total amount of energy consumed by the air-conditioning system and the V2L mode from the current time (e.g. 10 p.m. today) to the predicted departure time may be calculated, and the total amount of V2L energy that is used may be calculated based thereon.

The information-providing device 300 is a device mounted in the vehicle, which is controlled in operation by the controller 200. The information-providing device 300 serves to output and provide various pieces of information to the user. The information-providing device 300 may include a display device 310 (e.g. a cluster display) configured to display information, and may further include a sound output device 320.

Subsequently, the energy consumption calculation model unit 215 of the controller 200 calculates the amount of electric energy necessary to reach the selected charging station from the current location of the vehicle based on the information collected by the vehicle (S19). Here, the electric energy necessary to reach the charging station is the energy of the battery necessary to drive the motor while the vehicle moves using the motor. The process of calculating the electric energy will now be described below.

In the present disclosure, the electric energy necessary to reach the charging station from the current location of the vehicle will be referred to as "battery energy requirements" or "remaining SOC requirements" for reaching the charging station.

First, the energy consumption calculation model unit 215 determines the battery energy requirements (the remaining SOC requirements) for reaching the charging station on the assumption that the vehicle moves the set travel route from the current location of the vehicle to the charging station based on the navigation information. At this time, information about the average speed profile v and the road slope θ, which is information about the predicted driving environment, is used.

Here, the charging station is the charging station selected by the user, the closest charging station when the user does not select one, or any of all of the charging stations located within a predetermined distance from the current location of the vehicle.

In order to determine the battery energy requirements, the energy consumption calculation model unit 215 calculates a wheel torque and a wheel speed based on vehicle dynamics using the speed profile v(d), as shown in Equations 1 and 2 below.

$$T_{whl} = R_{tire}(\dot{v}M_{eq} + F_{load}) \quad \text{[Equation 1]}$$

$$\omega_{whl} = v/R_{tire} \quad \text{[Equation 2]}$$

In Equations 1 and 2, "$T_{whl}$" represents the wheel torque, "$R_{tire}$" represents the radius of a tire, "$\omega_{whl}$" represents the wheel speed, and "v" represents the vehicle speed, that is, the speed in the speed profile. In addition, "$M_{eq}$" represents the weight of the vehicle including inertia, and "$F_{load}$" represents a driving load, determined based on the road slope θ.

Subsequently, the energy consumption calculation model unit 215 calculates a motor torque $T_m$ and a motor speed $\omega_m$ using dynamic equations relating to the powertrain PT, as shown in Equations 3 and 4 below.

$$T_m = T_{whl}/(\eta_{gb}^{sgn(T_{tm})}\eta_{fd}^{sgn(T_{tm})}\gamma_{gb}\gamma_{fd}) \quad \text{[Equation 3]}$$

$$\omega_m = \gamma_{gb}\gamma_{fd}\omega_{whl} \quad \text{[Equation 4]}$$

In Equation 3, "$T_m$" represents the motor torque, "$\omega_m$" represents the motor speed, and "$T_{tm}$" represents the input torque of a transmission. In addition, "$\eta_{gb}$" represents the efficiency of the transmission, "$\eta_{fd}$" represents the efficiency of a final drive, "$\gamma_{gb}$" represents the gear ratio of the transmission, and "$\gamma_{fd}$" represents the gear ratio of the final drive.

Subsequently, the energy consumption calculation model unit 215 calculates the SOC consumption of the battery SÖC. The power consumption of the battery $P_{bat}$ is used to calculate the SOC consumption of the battery SÖC. The power consumption of the battery $P_{bat}$ may be calculated using Equation 5 below.

$$P_{bat} = \eta_{mot}^{-sgn(T_{tm})}T_m\omega_m \quad \text{[Equation 5]}$$

In Equation 5, "$P_{bat}$" represents the power consumption of the battery, "$\eta_{mot}$" represents the efficiency of the motor, "$T_m$" represents the motor torque, and "$\omega_m$" represents the motor speed.

Then, when the power consumption of the battery $P_{bat}$ is calculated, the SOC consumption of the battery SÖC may be calculated using Equation 6 below.

$$S\dot{O}C = -\frac{V_{OCV} - \sqrt{V_{OCV}^2 - 4P_{bat}R_{bat}}}{2Q_{bat}R_{bat}} \quad \text{[Equation 6]}$$

In Equation 6, "SÖC" represents the SOC consumption of the battery, and "$V_{ocv}$" represents the open-circuit voltage (OCV) of the battery. In addition, "$R_{bat}$" represents the resistance of the battery, and "$Q_{bat}$" represents the capacity of the battery.

When the SOC consumption of the battery SÖC is calculated as described above, the predicted SOC consumption of the battery ΔSOC, which is necessary to travel to the charging station along the travel route, is calculated, and the calculated predicted SOC consumption of the battery ΔSOC is corrected using a margin factor $C_{safe}$ set for safety.

Equation 7 below is an equation for correction.

$$SOC_{drive} = C_{safe} \cdot \Delta SOC \quad \text{[Equation 7]}$$

In Equation 7, "$SOC_{drive}$" represents the predicted SOC consumption of the battery after correction, "$C_{safe}$" represents the margin factor, and "ΔSOC" represents the predicted SOC consumption of the battery before correction.

When the predicted SOC consumption of the battery after correction $SOC_{drive}$ is determined as described above, an energy consumption factor $C_{traffic}$ is determined using traffic information received from the traffic information receiver 214, and the predicted SOC consumption of the battery after correction $SOC_{drive}$ is additionally corrected using the determined energy consumption factor $C_{traffic}$.

Here, the traffic information may be at least one of information on traffic congestion in each section (information on the average speed of vehicles), minimum speed information, or speed limit information, and the energy consumption factor $C_{traffic}$ may be determined based on a map using the traffic information as an input variable.

Accordingly, the predicted SOC consumption of the battery finally corrected as described above is finally determined to be the remaining SOC requirements $SOC_{required}$, that is, the battery energy requirements, meaning the amount of energy that needs to remain in the battery in order to reach the charging station. The predicted SOC consumption of the battery after correction $SOC_{drive}$ shown in Equation 7 is additionally corrected using the energy consumption factor $C_{traffic}$, as show in Equation 8 below.

$$SOC_{required} = C_{traffic} \cdot SOC_{drive} \quad \text{[Equation 8]}$$

Here, "$SOC_{required}$" represents the finally determined remaining SOC requirements, that is, the battery energy requirements for reaching the charging station, and "$C_{traffic}$" represents the energy consumption factor.

As described above, the energy consumption calculation model unit 215 of the charging station arrival energy calculator 210 finally determines the battery energy requirements for reaching the charging station selected by the user using various pieces of information collected by the vehicle, including the information provided from the vehicle driving information predictor 211.

Alternatively, when the user does not select a charging station, the battery energy requirements for reaching the closest charging station to the current location of the vehicle is finally determined. Alternatively, when the user does not select a charging station, the battery energy requirements for traveling each of the travel paths to all of the charging stations located within a predetermined distance from the current location of the vehicle is finally determined.

The remaining SOC requirements, that is, the battery energy requirements for reaching the charging station, calculated by the charging station arrival energy calculator 210 of the controller 200, are transmitted to the available time calculator 220.

When the electric energy necessary to reach the charging station, that is, the battery energy requirements for reaching the charging station (the remaining SOC requirements $SOC_{required}$) is calculated, the controller 200 compares the calculated battery energy requirements with the current amount of energy of the battery (S20). Here, the battery energy requirements may be the remaining SOC requirements for reaching the charging station, and the current amount of energy of the battery may be the current SOC of the battery.

When the battery energy requirements for reaching the charging station are compared with the current amount of energy of the battery, if the battery energy requirements are equal to or greater than the current amount of energy of the battery, the controller 200 determines that the amount of electric energy necessary to reach the charging station is currently insufficient, provides notification of insufficiency of the electric energy to the user through the information-providing device 300, and performs interruption control so as to interrupt the consumption and supply of the V2L electric power (the electric power of the battery) (S21).

In addition, when the amount of energy is insufficient, the controller 200 guides the user to again search for and select a charging station through the information-providing device 300. Subsequently, after the charging station is selected, the above process is identically performed on the charging station re-selected by the user.

On the other hand, if the current amount of energy of the battery is greater than the battery energy requirements for reaching the charging station, the controller 200 determines that the amount of electric energy necessary to reach the charging station is sufficient, and guides the user to determine whether to enter a V2L scheduling mode through the information-providing device 300 of the vehicle.

When the user wants to enter the V2L scheduling mode and thus selects the V2L scheduling mode through the input device 120, the controller 200 confirms selection of the mode by the user and enters the V2L scheduling mode (S22). When the user does not select the V2L scheduling mode, the consumption calculator 221 of the available time calculator 220 of the controller 200 measures and calculates the average value of the V2L electric power consumption during a set time period from the current time (e.g. the average consumption of the electric power for 5 minutes) (S23).

In addition, the time calculator 222 of the available time calculator 220 of the controller 200 calculates the available V2L electric power time based on the current amount of energy of the battery (or the current SOC of the battery) and the calculated average value of the V2L electric power consumption (S24), and displays the available V2L electric power time in real time through the display device 310 of the information-providing device 300 (S25). Here, the available V2L electric power time is the time period for which V2L electric power can be used without exceeding the current amount of energy of the battery on the assumption that the V2L electric power (the electric power of the battery) will be continuously used at the current average rate of V2L electric power consumption.

In addition, the controller 200 calculates the travelable distance of the vehicle based on the current information on the energy of the battery and displays the same in real time through the display device 310 of the information-providing device 300. Further, the controller 200 confirms the charging station that the vehicle is capable of reaching in real time through the navigation device 110 based on the calculated travelable distance, and provides notification of the confirmed charging station to the user (S26).

When entering the V2L scheduling mode according to the user selection, the controller 200 determines whether use of the air-conditioning system of the vehicle has been scheduled by the user (S27). Upon determining that use of the air-conditioning system has been scheduled, the controller 200 confirms the usage time of the air-conditioning system scheduled by the user (e.g. a total of 4 hours from 10 p.m. to 2 a.m.) and the set target air-conditioning temperature (S28).

Subsequently, the controller 200 determines the amount of energy necessary for air conditioning when the cooling/heating air-conditioning system is used based on the air-conditioning reservation information (S29). That is, the amount of energy to be consumed by the air-conditioning system to maintain the target air-conditioning temperature is predicted. At this time, the amount of energy to be consumed for air conditioning may be determined using an air-conditioning consumption energy map using the current temperature of external air detected by a sensor, the target air-conditioning temperature, and the usage time as input variables.

The air-conditioning consumption energy map is a map in which the correlation between the input variables, including the temperature of external air, the target air-conditioning temperature, and the usage time, and the output variable, that is, the amount of energy consumed, is defined in advance. In other words, the air-conditioning consumption energy map may be data in which the amount of energy consumed is set in accordance with the temperature of external air, the target air-conditioning temperature, and the usage time. This set data may be input and stored in the controller 200, and may be used to calculate the amount of energy to be consumed according to the temperature of external air, the target air-conditioning temperature, and the usage time.

Subsequently, the controller 200 calculates the currently necessary remaining energy requirements based on the predicted amount of energy consumed by the air-conditioning system and the battery energy requirements for reaching the charging station, and compares the calculated remaining energy requirements with the current amount of energy of the battery (S30).

The controller 200 may determine the remaining energy requirements by adding a preset margin value to the sum of the predicted amount of energy consumed by the air-conditioning system and the previously calculated battery energy requirements for reaching the charging station (i.e. the remaining SOC requirements).

After the currently necessary remaining energy requirements are determined, the same is compared with the current amount of energy of the battery. If the current amount of energy of the battery is equal to or less than the remaining energy requirements, the controller 200 provides notification of that the current amount of energy of the battery is insufficient through the information-providing device 300 (S31). Accordingly, the user may confirm the notification, and may adjust the usage time, among the various pieces of reservation information on the air-conditioning system.

If the current amount of energy of the battery is greater than the remaining energy requirements or if use of the air-conditioning system has not been scheduled by the user, the controller 200 determines the amount of energy obtained by subtracting the remaining energy requirements from the current amount of energy of the battery to be the amount of energy that can be used in the V2L mode (hereinafter referred to as "available energy").

When the use of the air-conditioning system of the vehicle has not been scheduled by the user, the amount of energy consumed by the air-conditioning system is 0 (zero), and accordingly, the remaining energy requirements are equivalent to the sum of the battery energy requirements for reaching the charging station and the margin value. In this case, of course, the available energy in the V2L mode is equivalent to a value obtained by subtracting the remaining energy requirements from the current amount of energy of the battery. Here, because the amount of energy consumed by the air-conditioning system is 0, the remaining energy requirements are equivalent to the sum of the battery energy requirements and the margin value.

In addition, the controller 200 displays information about an electronic product, for which V2L electric power can be used, through the display device 310 of the information-providing device 300. For example, the controller 200 displays the list of available electronic products, such as a laptop computer, an electric heater, an electric rice cooker, a hair dryer, sound equipment, and a speaker, through the display device 310, and enables the user (the driver, etc.) to select and input the desired electronic product through the input device 120.

Here, the number of electronic products selected and input by the user may be one or more. In addition to selecting the desired electronic product, the user may also input an expected time of use for the selected electronic product through the input device 120 (S32 and S33). In this case, the controller 200 may use the input expected time of use to calculate the available time.

In addition, the controller 200 confirms input of the electronic product, and calculates the available V2L electric power time for the electronic product selected by the used based on the determined available energy (S32 to S34). In order to calculate the available V2L electric power time for the electronic product, the controller 200 needs to have information about the electric power consumption (the amount of electricity used) per unit time of the electronic product selected by the user.

Here, as the electric power consumption per unit time of the selected electronic product, a value preset for each electronic product and stored in the controller 200 may be used. The available V2L electric power time for the selected electronic product is calculated using the electric power consumption per unit time corresponding to the preset value.

Alternatively, the user may be allowed to directly input the electric power consumption per unit time of the selected electronic product through the input device 120. In this case, the controller 200 calculates the available V2L electric power time based on the electric power consumption per unit time directly input by the user.

Alternatively, while the user is using the desired electronic product in the state of connecting the same to the vehicle, the time calculator 222 of the available time calculator 220 of the controller 200 may calculate the available V2L electric power time for the electronic product that is currently being used based on the real-time V2L electric power consumption. After the available V2L electric power time for the electronic product is calculated, the controller 200 displays the same through the display device 310 of the information-providing device 300 to provide notification of the same to the user (S35).

In the embodiment of the present disclosure, when the user selects multiple electronic products and inputs an expected time of use for some of the selected multiple electronic products, the time calculator 222 of the available time calculator 220 of the controller 200 calculates the available V2L electric power time for the remaining electronic products for which an expected time of use has not been input using the calculated available energy in the V2L mode, the electric power consumption per unit time of some of the electronic products, and the expected time of use for some of the electronic products, and displays the calculated available time on the display device 310.

For example, in the case of selecting the sound equipment, the speaker, the electric rice cooker, and the TV, when the user inputs 2 hours as the expected time of use for the sound equipment, the speaker, and the electric rice cooker, and does not input an expected time of use for the TV, the controller 200 performs control such that the expected time of use for the sound equipment, the speaker, and the electric rice cooker is displayed to be 2 hours through the display device 310.

In this case, with regard to the TV, the time calculator 222 of the available time calculator 220 of the controller 200 subtracts the amount of energy consumed by using the sound equipment, the speaker, and the electric rice cooker for 2 hours from the available energy in the V2L mode, calculates the available time of the TV based on the result of the subtraction and the electric power consumption per unit time of the TV, and displays the calculated available time of the TV through the display device 310. Of course, the amount of energy consumed by using the sound equipment, the speaker, and the electric rice cooker for 2 hours may be calculated using the electric power consumption per unit time of these electronic products and the expected time of use for the same (2 hours).

Also, in the case in which the number of remaining electronic products for which an expected time of use has not been input is two or more, the available time thereof is calculated on the assumption that the multiple remaining electronic products will be used simultaneously during the same time period. In other words, the calculated available time of the multiple remaining electronic products is assumed to be uniform.

In this case, the total energy consumption of some of the electronic products for which an expected time of use has been input is subtracted from the available energy in the V2L mode, and the available time for which the remaining electronic products can be simultaneously used within the range of the available energy determined by the subtraction is calculated, and is displayed through the display device 310.

When the user has not input an expected time of use for any of the selected electronic products, the time calculator 222 of the available time calculator 220 of the controller 200 calculates the available time within the range of the available energy in the V2L mode based on information about the electric power consumption per unit time of each electronic product on the assumption that all of the selected electronic products will be used simultaneously during the same time period, and the calculated available time is displayed through the display device 310.

For example, when the user has selected the speaker and the TV and has not input an expected time of use for either of the speaker and the TV, the available V2L electric power time may be displayed as 3 hours based on the assumption that the speaker and the TV will be used simultaneously.

Alternatively, in the case in which the number of remaining electronic products for which an expected time of use has not been input is two or more, the available time of each of the remaining electronic products within the range of the available energy may be displayed through the display device 310 on the assumption that each of the remaining electronic products will be individually used together with the electronic products for which an expected time of use has been input.

For example, in the case in which electronic products A, B, C, and D are present and in which the user has input an expected time of use only for the electronic products A and B, when only the electronic product C among the electronic products C and D is used together with the electronic products A and B (i.e. when the electronic products A, B, and C are used), the available time of the electronic product C is displayed, and when only the electronic product D among the electronic products C and D is used together with the electronic products A and B (i.e. when the electronic products A, B, and D are used), the available time of the electronic product D is displayed.

Also, when the user has not input an expected time of use for any of the selected electronic products, the controller 200 may calculate the available time of each electronic product within the range of the available energy in the V2L mode based on information about the electric power consumption per unit time of each electronic product on the assumption that all of the selected electronic products will be used alone, and may display the available time of each electronic product through the display device 310.

For example, in the case in which electronic products A, B, C, and D are present and in which the user has not input an expected time of use for any of the electronic products A, B, C, and D, when the electronic products A, B, C, and D are used independently, the available time of each of the electronic products A, B, C, and D is displayed individually.

In addition, the controller 200 periodically re-calculates the available time at regular time intervals while the electronic product is used, and displays the newly calculated available time through the display device 310. In this way, the controller 200 periodically re-calculates and updates the aforementioned displayed information, i.e. the information displayed through the display device 310.

In addition, the controller 200 newly obtains information about the travelable distance of the vehicle and the charging station that the vehicle is capable of reaching at regular time intervals based on information about the electric power consumption and the remaining energy of the battery (the remaining SOC of the battery) while the electronic product is used, and displays the newly obtained information through the display device 310 (S36 and S37).

In addition, if the battery is currently being charged by a solar cell, the controller 200 may calculate the available energy in the V2L mode by adding the amount of energy generated by power generation by the solar cell, i.e. the charge energy generated by the solar cell, to the current amount of energy of the battery, may calculate the available time of the electronic product based on the available energy including the charge energy, and may display the calculated available time on the display device 310.

In the case of charging the battery by means of a solar roof while simultaneously using V2L electric power for the electronic product connected to the vehicle, the available time of the electronic product is calculated based on the charge energy generated by the solar roof, and is displayed (e.g. the available time of the electronic product when using the solar roof: 3 hours).

Figure 3:
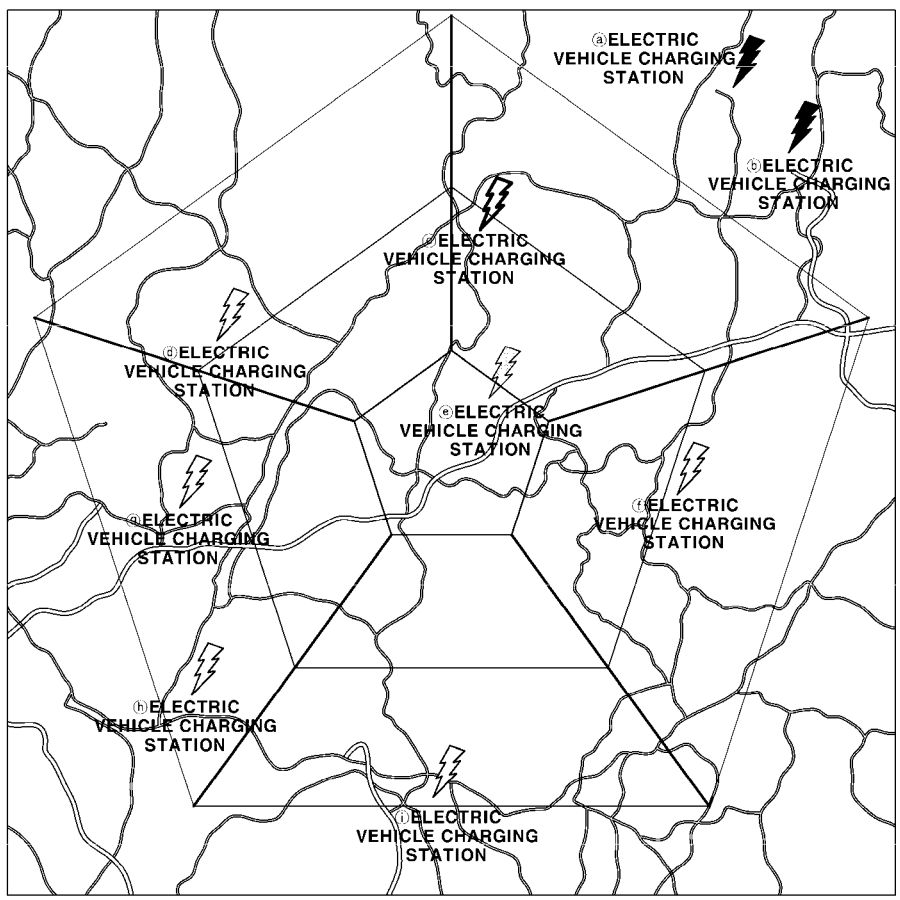
FIG. 3 is a view showing an example in which information on charging stations that a vehicle is capable of reaching is displayed through a display device according to an embodiment of the present disclosure.

FIG. 3 is a view showing an example in which information on the charging stations that the vehicle is capable of reaching is displayed through the display device according to an embodiment of the present disclosure. As illustrated, when the charging stations that the vehicle is capable of reaching from the current location of the vehicle are determined based on the locations thereof and on the information on the current amount of energy of the battery, the locations of the determined charging stations may be displayed in a map through the display device (which may be the display device of the navigation device) to be shown to the user.

The available time of each of the electronic products selected by the user, which is calculated using information on the battery energy requirements for reaching each of the charging stations, is shown on the right of the map in FIG. 3. The available time shown on the right of the map in FIG. 3 may be the available time of each electronic product calculated for each charging station on the assumption that each electronic product will be used alone.

The controller 200 may include a processor or a microprocessor and a memory. The aforementioned operations/functions performed by the controller and the components thereof can be embodied as computer readable code/algorithm/software stored on the memory which may include a computer readable recording medium. The computer readable recording medium is any data storage device that can store data which can thereafter be read by the processor or the microprocessor. Examples of the computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, etc. The processor or the microprocessor may perform the above-described operations/functions, by executing the computer readable code/algorithm/software stored on the computer readable recording medium.

As is apparent from the above description, a method of providing guidance for use of electric power of an electric vehicle according to the present disclosure is capable of limiting use of electric power in a V2L mode of an electric vehicle or providing information on use of the electric power.

In particular, according to the present disclosure, the travelable distance of an electric vehicle may be estimated based on a travel route, and may be utilized to limit the use of V2L electric power. In addition, when using a V2L function of an electric vehicle, the user is capable of using V2L electric power as planned in consideration of the amount of energy consumed to reach a charging station.

In addition, it is possible to provide notification of the available time of each electronic product when V2L electric power is used at the current rate of electric power consumption. When the remaining amount of energy of the battery falls below the battery energy requirements necessary to reach a charging station, it is possible to limit the use of the V2L electric power or to provide information on use of the V2L electric power.

In addition, it is possible to select a charging station based on a travel route and to calculate the amount of energy necessary to reach the selected charging station, thus making it possible for a driver to drive an electric vehicle without taking a detour to reach a charging station.

It will be appreciated by those skilled in the art that the effects achievable through the disclosure are not limited to those that have been particularly described hereinabove, and other effects of the disclosure will be more clearly understood from the above detailed description.

The present disclosure has been described above with reference to an exemplary embodiment. The embodiment described in the specification and shown in the accompanying drawings is illustrative only and is not intended to represent all aspects of the disclosure. Therefore, the present disclosure is not limited to the embodiment presented herein, and it is to be understood by those skilled in the art that various modifications or changes can be made without departing from the technical spirit or scope of the disclosure as disclosed in the appended claims.

What is claimed is:

1. A method of providing guidance for use of electric power of an electric vehicle, the method comprising:
   receiving, by a processor of the vehicle, information on a set travel route to an electric vehicle charging station near a current location of the vehicle from a navigation device in a vehicle-to-load (V2L) mode;
   calculating, by the processor, battery energy requirements necessary for the vehicle to move from the current location to the charging station along the set travel route using a motor based on predicted driving information collected by the vehicle;
   calculating, by the processor, an available amount of energy in the V2L mode based on the calculated battery energy requirements and a current amount of energy of a battery;
   calculating, by the processor, an available usage time of an electronic product based on electric power consumption per unit time of the electronic product and the calculated available amount of energy; and
   displaying, by the processor, the calculated available usage time of the electronic product through an information-providing device.

2. The method of claim 1, wherein, when determining that a predetermined amount or more of V2L electric power is being consumed from the battery mounted in the vehicle while the vehicle is stopped, the processor enters the V2L mode.

3. The method of claim 1, further comprising:
   finding, by the navigation device, charging stations located within a predetermined distance from the current location of the vehicle and displaying the found charging stations,
   wherein, when a user selects a desired charging station among the displayed charging stations, the navigation device transmits information on a travel route to the selected charging station to the processor, and
   wherein the processor calculates battery energy requirements necessary to reach the charging station selected by the user.

4. The method of claim 1, wherein the calculating of the battery energy requirements comprises:
   calculating a predicted state of charge (SOC) consumption of the battery necessary for the vehicle to move to the charging station along the set travel route based on the collected predicted driving information;
   correcting the calculated predicted SOC consumption of the battery using a margin factor set for safety;
   determining an energy consumption factor using traffic information received through a traffic information receiver; and
   additionally correcting the corrected predicted SOC consumption of the battery using the energy consumption factor determined based on the traffic information to determine a value obtained by the additional correction to be the battery energy requirements.

5. The method of claim 1, further comprising:
   comparing, by the controller, the calculated battery energy requirements with the current amount of energy of the battery; and
   when the calculated battery energy requirements are equal to or greater than the current amount of energy of the battery, providing notification, by the controller, of insufficiency of electric energy through the information-providing device.

6. The method of claim 5, further comprising:
   when the calculated battery energy requirements are equal to or greater than the current amount of energy of the battery, performing interruption control so as to interrupt consumption and supply of electric power of the battery.

7. The method of claim 1, further comprising:
comparing, by the processor, the calculated battery energy requirements with the current amount of energy of the battery,
wherein, when the current amount of energy of the battery is greater than the calculated battery energy requirements, the method further comprises:
calculating the available amount of energy in the V2L mode;
calculating the available usage time of the electronic product; and
displaying the calculated available usage time of the electronic product.

8. The method of claim 1, further comprising:
comparing, by the processor, the calculated battery energy requirements with the current amount of energy of the battery;
when the current amount of energy of the battery is greater than the calculated battery energy requirements, determining, by the processor, whether a V2L scheduling mode is selected;
when the V2L scheduling mode is not selected, calculating, by the processor, a V2L electric power consumption average value during a set time period from a current time point;
when V2L electric power is used at a rate of the calculated V2L electric power consumption average value, calculating, by the processor, an available V2L electric power time for which the V2L electric power is used within a range of the current amount of energy of the battery; and
displaying, by the processor, the calculated available V2L electric power time through the information-providing device.

9. The method of claim 1, further comprising:
comparing, by the processor, the calculated battery energy requirements with the current amount of energy of the battery;
when the current amount of energy of the battery is greater than the calculated battery energy requirements, determining, by the processor, whether a V2L scheduling mode is selected;
when the V2L scheduling mode is selected, determining, by the processor, whether use of an air-conditioning system of the vehicle has been scheduled;
when use of the air-conditioning system of the vehicle has been scheduled, determining, by the processor, energy consumption by the air-conditioning system of the vehicle when the air-conditioning system is used based on information on reservation of use of the air-conditioning system;
calculating, by the processor, remaining energy requirements necessary to use the air-conditioning system based on the determined energy consumption and the battery energy requirements; and
comparing, by the processor, the calculated remaining energy requirements with the current amount of energy of the battery,
wherein, when the current amount of energy of the battery is greater than the remaining energy requirements, the method further comprises:
calculating the available amount of energy in the V2L mode;
calculating the available usage time of the electronic product; and
displaying the calculated available usage time of the electronic product.

10. The method of claim 9, wherein, in the determining the energy consumption by the air-conditioning system of the vehicle, the energy consumption is determined using an air-conditioning consumption energy map based on a temperature of external air, a target air-conditioning temperature, and an air-conditioning system usage time, the target air-conditioning temperature and the air-conditioning system usage time being set by a user as the information on reservation of use of the air-conditioning system.

11. The method of claim 9, wherein, when the current amount of energy of the battery is equal to or less than the remaining energy requirements, the processor provides notification of insufficiency of the amount of energy of the battery through the information-providing device.

12. The method of claim 9, wherein the remaining energy requirements are determined by adding a preset margin value to a sum of the determined energy consumption and the battery energy requirements.

13. The method of claim 9, wherein, in the calculating the available amount of energy in the V2L mode, the processor obtains the available amount of energy in the V2L mode by subtracting the calculated remaining energy requirements from the current amount of energy of the battery.

14. The method of claim 9, wherein, when use of the air-conditioning system of the vehicle has not been scheduled, the calculating the available amount of energy in the V2L mode, the calculating the available usage time of the electronic product, and the displaying the calculated available usage time of the electronic product are performed.

15. The method of claim 14, wherein, when use of the air-conditioning system of the vehicle has not been scheduled, in the calculating the available amount of energy in the V2L mode, the processor obtains the remaining energy requirements by summing the battery energy requirements and a margin value, and obtains the available amount of energy in the V2L mode by subtracting the obtained remaining energy requirements from the current amount of energy of the battery.

16. The method of claim 1, further comprising:
comparing, by the processor, the calculated battery energy requirements with the current amount of energy of the battery;
when the current amount of energy of the battery is greater than the calculated battery energy requirements, determining, by the processor, whether a V2L scheduling mode is selected;
when the V2L scheduling mode is selected, determining, by the processor, whether use of a load of the vehicle has been scheduled;
when use of the load of the vehicle has been scheduled, determining, by the processor, energy consumption by the load of the vehicle when the load is used based on information on reservation of use of the load;
calculating, by the processor, remaining energy requirements necessary to use the load based on the determined energy consumption and the battery energy requirements; and
comparing, by the processor, the calculated remaining energy requirements with the current amount of energy of the battery,
wherein, when the current amount of energy of the battery is greater than the remaining energy requirements, the method further comprises:

calculating the available amount of energy in the V2L mode;

calculating the available usage time of the electronic product; and displaying the calculated available usage time of the electronic product.

17. The method of claim 16, wherein, in the determining the energy consumption by the load of the vehicle, the energy consumption is determined using a load consumption energy map set by a user as the information on reservation of use of the load.

18. The method of claim 16, wherein, when the current amount of energy of the battery is equal to or less than the remaining energy requirements, the processor provides notification of insufficiency of the amount of energy of the battery through the information-providing device.

19. The method of claim 16, wherein the remaining energy requirements are determined by adding a preset margin value to a sum of the determined energy consumption and the battery energy requirements.

20. The method of claim 16, wherein, in the calculating the available amount of energy in the V2L mode, the processor obtains the available amount of energy in the V2L mode by subtracting the calculated remaining energy requirements from the current amount of energy of the battery.

* * * * *